N. BLANCHET.
VEHICLE BRAKE.
APPLICATION FILED JAN. 14, 1913.
1,082,396.
Patented Dec. 23, 1913.
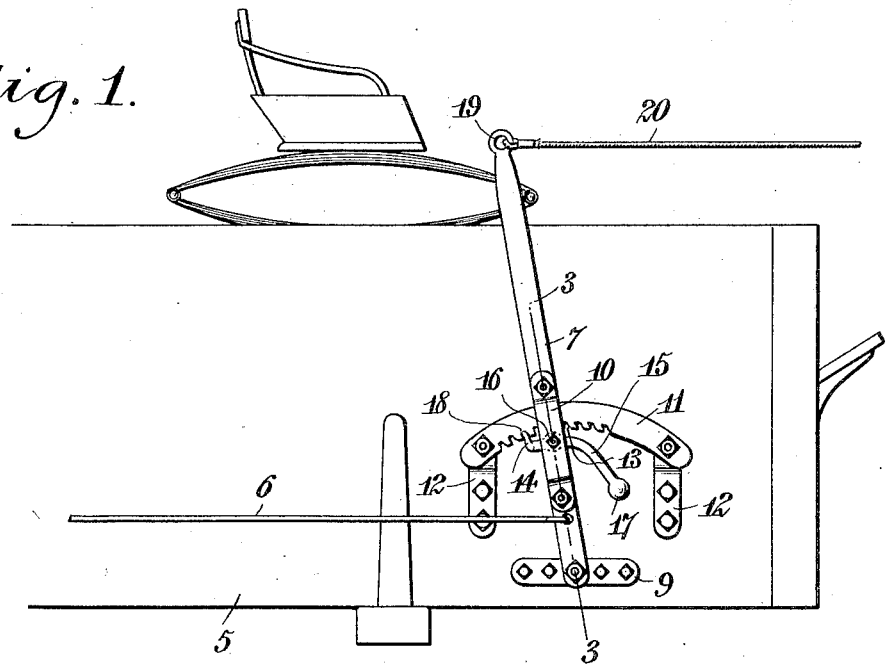
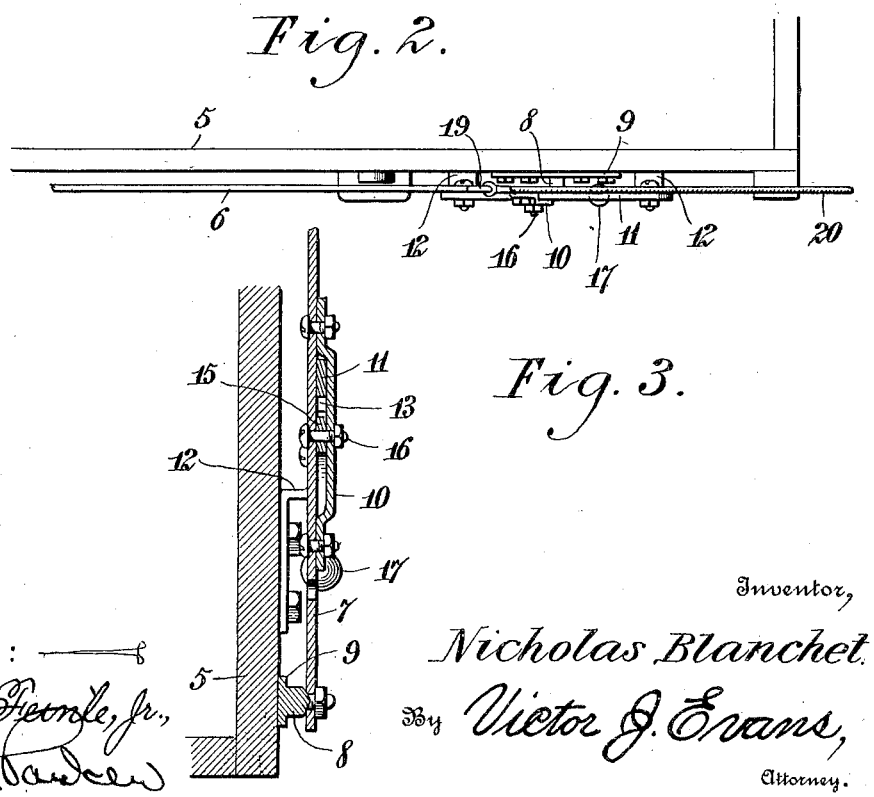
Witnesses:
Christ Feonle, Jr.
Inventor,
Nicholas Blanchet.
By Victor J. Evans,
Attorney.

UNITED STATES PATENT OFFICE.

NICHOLAS BLANCHET, OF NYE, OREGON.

VEHICLE-BRAKE.

1,082,396.  Specification of Letters Patent.  Patented Dec. 23, 1913.

Application filed January 14, 1913. Serial No. 741,978.

*To all whom it may concern:*

Be it known that I, NICHOLAS BLANCHET, a citizen of the United States, residing at Nye, in the county of Umatilla and State of Oregon, have invented new and useful Improvements in Vehicle-Brakes, of which the following is a specification.

The invention relates to vehicle brakes, and more particularly to the class of trail braking devices for use on vehicles.

The primary object of the invention is the provision of a device of this character wherein the brakes of a vehicle can be readily and quickly applied by an operator either when occupying the seat in said vehicle or when mounted on the draft animal.

Another object of the invention is the provision of a device of this character wherein the same can be mounted at either side of the body of the vehicle for operation by the teamster when seated in the said vehicle or when riding the animal pulling the same, the device being operated from a jerk line when the operator is mounted on the back of the animal.

A further object of the invention is the provision of a braking device of this character which is extremely simple in construction, thoroughly reliable and efficient in its purpose, and inexpensive in manufacture.

With these and other objects in view, the invention consists in the construction, combination and arrangement of parts as will be hereinafter more fully described, illustrated in the accompanying drawings, and pointed out in the claims hereunto appended.

In the drawings:—Figure 1 is a fragmentary side elevation of a wagon box showing the brake device applied thereto. Fig. 2 is a top plan view thereof. Fig. 3 is a sectional view on the line 3—3 of Fig. 1.

Similar reference characters indicate corresponding parts throughout the several views in the drawing.

Referring to the drawing by numerals, 5 designates a portion of a wagon box which is of the ordinary well-known construction, and 6 the usual pull brake rod which is adapted to be connected to the brake beam in the ordinary well-known manner whereby the brakes can be readily applied to the wheels of the vehicle as usual.

The device comprises a throw lever 7, the lower end of which is loosely connected to a pivot stud 8 integrally formed with a base 9 which is bolted or otherwise secured to the side of the wagon box 5 exteriorly thereof, and to this lever 7 is connected the forward end of the brake rod 6, as shown. Mounted upon the throw lever 7 at the opposite side thereof is a guide strap 10 which is fixed to the lever in any suitable manner, and between it and the said lever is arranged an upwardly arched rack bar 11, the same being secured at opposite ends to brackets 12, which are fixed to the outer face of the side of the wagon box 5 in any desirable manner, the brackets being designed to offset the rack bar 11 in parallel relation to the side of the wagon box.

The rack bar 11 has formed in its lower edge rack teeth 13 with which detachably engage a latch lip 14 formed at one end of a latch arm 15 arranged between the strap 10 and the lever 7, the arm 15 being mounted upon a pivot 16 engaged in the said lever 7 and strap 10, while the opposite end of the arm 15 has integrally formed therewith a weight ball 17 which is designed to force the lip 14 into positive locking engagement with the rack teeth 13, and in this manner lock the lever 7 in adjusted position. The lip 14 has a rounded edge 18 which permits the said lip to freely ride over the teeth 13 when the lever 7 is being shifted.

Formed at the upper end of the lever 7 is an eye 19 with which is engaged one end of a jerk line 20, the latter being extended forwardly to the desired point over the back of the animal hitched to the wagon so that should an operator be mounted upon the back of the animal by gripping the jerk line 20 and pulling upon the same the brakes can be applied. Should a sudden jerk be exerted upon the line 20 and thereafter the pull suddenly released from the line the lip 14 of the latch arm 15 will ride over the rack teeth 13 on the rack bar 11 and by reason of the usual tension upon the brakes with the brake beam when the brakes are applied the said lever 7 will be brought to normal position and the brakes released.

From the foregoing, it is thought that the construction and manner of operation of the device will be clearly understood, and therefore a more extended explanation has been omitted.

The brake device hereinbefore described is especially adapted for use with trail wagons, and when the device is applied to a trail wagon the same is operated by a jerk line either from the seat of the lead wagon or from the back of the draft animal. Now, should the brake device be used on both the trail and lead wagons it is necessary that each brake be operated by independent jerk lines. The brake device can also be applied to an ordinary wagon box construction.

What is claimed is:—

The combination with a brake rod, of a throw lever adapted to have one of its ends pivoted to the side of a wagon box and connected with the rod, a rack bar adapted to be mounted on the said wagon box and having rack teeth in its lower edge, and a weighted locking member carried by the lever and engageable with the rack teeth.

In testimony whereof I affix my signature in presence of two witnesses.

NICHOLAS BLANCHET.

Witnesses:
J. B. PERRY,
T. L. ADKINSON.

Copies of this patent may be obtained for five cents each, by addressing the "Commissioner of Patents, Washington, D. C."